United States Patent [19]

Lopez

[11] 4,196,015

[45] Apr. 1, 1980

[54] REWETTING SOLUTION AND METHOD FOR ALUMINIZING IMAGE DISPLAY FACEPLATES

[75] Inventor: Hugo A. Lopez, Glendale Heights, Ill.

[73] Assignee: Zenith Radio Corporation, Glenview, Ill.

[21] Appl. No.: 935,032

[22] Filed: Aug. 18, 1978

[51] Int. Cl.² .......................... B05D 5/06; B05D 5/12
[52] U.S. Cl. .......................... 106/287.24; 106/287.34; 427/64; 427/68; 427/344; 252/313 S
[58] Field of Search ............... 106/287.34; 252/313 S; 427/64, 68, 344, 419 B

[56] References Cited

U.S. PATENT DOCUMENTS

| | | | |
|---|---|---|---|
| 2,696,444 | 12/1954 | Rossin | 106/287.34 |
| 3,099,763 | 7/1963 | Gentry | 427/64 |
| 3,591,518 | 7/1971 | McMillan | 252/313 S |
| 3,677,954 | 7/1972 | Nakajima | 252/313 S |
| 3,752,679 | 8/1973 | Moore | 427/344 |
| 3,920,578 | 11/1975 | Yates | 427/68 |
| 3,940,508 | 2/1976 | Wilcox | 106/287.34 |

*Primary Examiner*—Michael F. Esposito
*Attorney, Agent, or Firm*—Ralph E. Clarke, Jr.

[57] ABSTRACT

This invention relates to improvements in the art of aluminizing the phosphor screens of image display devices such as television cathode ray picture tubes. A solution for rewetting a phosphor-bearing image display faceplate prior to aluminizing comprises a highly alkaline aqueous dispersion of a siliceous coating agent and a surfactant. The solution according to the invention includes an acidic pH-lowering substance in an amount sufficient to adjust pH to a neutral range.

4 Claims, No Drawings

GRINDING OF PIGMENTS

BACKGROUND OF THE INVENTION

1. Field of the Invention

This invention relates to an improvement in salt grinding procedures of pigments, which is employed to enhance the pigmentary qualities of coloring matters to facilitate recovery of the pigment and to minimize production of pollutants.

2. Description of the Prior Art

From B.P. No. 951,820, it is known that solids, particularly coloring matter such as pigments may be obtained in finely divided state by the salt milling technique, in which a solid is milled with a solid inorganic substance such as sodium chloride or calcium carbonate, hard objects such as steel balls and iron nails being usually used as grinding aids. The inorganic material is subsequently removed from the finely divided solid by extraction with water or diluted acid or alkali.

It is also known that solids may be obtained in a finely divided state by viscous milling or plastic milling a mixture of the solid with inorganic material and sufficient organic liquid to provide a shearable magma and subsequently removing the inorganic material by extraction with water or dilute acid or alkali.

Other equipment and grinding conditions such as high speed stirrer with three discs at right angles to the shaft have also been described.

There is considerable patent literature describing this pigment finishing process with variations in mill charges, but basically the charges consist of:
 a. pigments to be improved,
 b. water soluble salts of various compositions or mixtures of them,
 c. organic treating agent which is either water soluble in alkaline or acid solutions,
 d. other additives.

After several hours of grinding, an optimum pigment is obtained after which the entire mass is charged into water, or water containing some acid or alkali. The salt and organic treating agents enter into solution while the pigment remains in a fine dispersion. After additional proprietary treatments, the pigment is separated by filtration and the liquor containing the salt and organic treating agents are discarded and enter the effluent streams with its subsequent environmental problems. The salt and organic treating agents are in such a dilute state that an economic recovery is not possible.

The literature mentions a great variation in the proportion of salt and organic treating agent per pigment, but generally the commerical practice has about the following grinding composition:
 a. 1 part of pigment,
 b. 4 to 8 parts of salt,
 c. 0.5 to 1 part of organic treating agents,
 d. additional modifying agents or mixtures of organic treating agents.

Since more than 16,000,000 pounds of pigment are treated yearly in the United States by this finishing procedure, about 100,000,000 pounds of salts and 15,000,000 pounds of organic materials will enter the effluent streams unless costly waste water treatment systems are installed. Where strict pollution laws are enforced, only costly water evaporation of the liquors has been found to comply with the laws.

Pigments that can be improved by the salt grinding methods and which are mentioned in the literature include: metal-free or metal phthalocyanines and particularly the copper, nickel, cobalt, zinc, aluminum, tin and manganese phthalocyanines. The phthalocyanine nucleus can be unsubstituted or substituted, for instance, with halogen or sulfonic acid groups as, for example, (U.S. Pat. No. 3,936,315), carbazole Dioxazine Violet (U.S. Pat. No 3,598,625), Quinacridones (U.S. Pat. No. 3,148,191), and Azo pigments, Vat pigments, Chrome pigments, and Lake pigments. (U.S. Pat. No. 3,437,503)

As stated in the existing patent literature, the pigments to be improved by the salt grinding method are ground under the conditions of shear in the presence of about 2 to about 8 parts of a particulate salt grinding aid, . . . and sufficient organic liquid conditioning agent to form a dough like cohesive mass and to maintain shear conditions. Grinding is continued until a pigment of high tinctorial strength is obtained and the exact time period employed will of course, vary depending upon such factors as the type of particle size of crude, efficiency and power input of the grinding apparatus, viscosity of the grinding mass, particle size of the grinding aid, etc. The grinding time may vary from about one hour to about 24 hours. Extended grinding is not harmful, but adds to the cost of the product. (U.S. Pat. No. 3,936,315)

SUMMARY OF THE INVENTION

In summary, the invention provides a method whereby pigments such as phthalocyanine can be comminuted by milling with a salt grinding aid such as sodium chloride or calcium carbonate or other normally used salts, and an organic conditioner. When the desired state of subdivision is reached, the milled material or mass is dispersed in an organic liquid which is a solvent for the conditioner, but which is unreactive towards the grinding aid or the pigment. The suspension is centrifuged to remove the suspended grinding aid and oversized pigment as a sediment and give a liquid dispersion of comminuted pigment particles from which the dispersed pigment can be recovered by filtering. The solvent can be recovered from the filtrate by distillation or other appropriate means and the conditioner can be returned to the milling step of a subsequent batch of material along with the sediment from the centrifuge and fresh pigmentary material to be ground. The solvent can be returned to a subsequent batch of material at the proper stage. This permits the carrying out of a salt milling operation without the generation of undesirable pollutants which may be difficult and expensive to dispose of.

The temperature during grinding can vary over a considerable range but for good quality control the optimum temperature should be established for each particular mixture. The temperature ranges disclosed in existing literature vary from 20° C. to 140° C. The desired grinding forces, which are shearing in nature, can be attained using known grinding or milling apparatus such as the Baker Perkins or W-P or Ko-Kneader type. For most dyes, any mixing apparatus which is capable of delivering a power input of at least 0.10 HP per pound of pigment in the crude will be adequate to provide shear conditions in accordance with the invention.

Commonly employed grinding aids are the water soluble salts of the mineral acids such as: alkali or alkaline earth metal halides, sulphates, phosphates, and particularly sodium, potassium or calcium chlorides, sulfates, acid sulfates, and carbonates.

cent, preferably 0.00268 weight percent; and an acidic pH-lowering substance in an amount sufficient to adjust pH to about 6.0 to 7.8, and preferably, about 6.2 to 7.8. The pH-lowering substance is preferably acetic acid.

The aqueous colloidal dispersion of silica particles acts primarily as a coating and adherent agent for the organic film and the aluminum film that is to be deposited thereon. The colloidal dispersion medium is preferably one that is independent of pH to provide stability in the neutral pH range; that is, precipitation will not occur when an acidifying agent is added to the medium. Ludox(TM) AM supplied by E. I. duPont de Nemours & Co., Inc. of Wilmington, Delaware has been found to be a suitable medium.

The non-ionic surface-active agent, or "surfactant," may comprise a modified polyethoxy adduct. By way of example, Triton(TM) CF-54, supplied by Rohm & Haas Company, Philadelphia, Pennsylvania, has been determined to be an effective surfactant.

The acidic pH-lowering substance may comprise a suitable dilution of an acid such as acetic or phosphoric, but preferably comprises acetic acid in a one-percent aqueous solution. The glacial concentration of acetic acid may be used provided that it is diluted accordingly.

EXAMPLE 2

Pour into a 55-gallon drum 400 lb. of deionized water at a temperature of 80° F. to 84° F., preferably 82° F.

Add 4,312 milliliters of a 28 weight percent mixture of potassium silicate

Add slowly while stirring 2,500 milliliters of a 25 percent solution of acetic acid. Stir for 10 minutes Check pH; the pH should be about 6.8 to 8.0, and preferably, about 6.8 to 7.8

Add 239 milliliters of surfactant diluted to 10 percent

Mix for three minutes.

The rewetting solution according to the Example 2 embodiment of the invention is now ready for use.

The Example 2 solution according to the invention comprises an aqueous solution of potassium silicate, said potassium silicate comprising about 0.3 to 1.0 weight percent, preferably 0.65 weight percent; a nonionic surfactant comprising about 0.01 to 0.02 weight percent, preferably 0.013 weight percent; and an acidic pH-lowering substance in an amount sufficient to adjust pH to about 6.8 to 8.0, preferably about 6.8 to 7.8. The pH-lowering substance may comprise a suitable dilution of an acid such as acetic or phosphoric, but is preferably acetic acid.

APPLICATION

Rewetting solutions according to the invention are applied to the faceplate following the depositing of the phosphors. The faceplate may be either wet or dry for application of the rewetting solutions according to the invention. Following the application of a rewetting solution, an organic material, typically a lacquer, is applied as a separate layer jhaving a thickness in microns. The lacquer is dried, the aluminum film is deposited, and the lacquer is baked out, leaving the aluminum film adherent to the phosphor. The processes of luminescent material deposition and application of a rewet solution, the lacquer, the aluminum film, and the intermediate steps are all well-known to those skilled in the art of manufacturing image display devices and need no further exposition.

The exact means by which the rewetting solutions and method according to the invention enhance the adherence and quality of the aluminizing layer to the phosphor layer is not known. Prior art rewetting solutions normally have pH values very high on the alkaline side due to the siliceous components; that is, a pH in the range of 10 to 13. Solutions of such alkalinity have proved to be often productive of thin, inadherent films having many blemishes. In consequence, defects were numerous and yields were low. By lowering the pH of the rewetting solutions according to the invention to fall within the neutral pH-limits defined heretofore, the subsequent aluminum film deposit was unexpectedly made a great deal more adherent. Also, blemishes in the organic film and aluminum film are far fewer and yields much higher, resulting in significant reductions in manufacturing costs. Reflectance and uniformity of reflectance are excellent, and the thickness of the aluminum film is uniform. The aluminum film is resistant to thermal or physical shock and is not dislodged by normal handling during manufacture and shipping. The process has been used in the manufacture of more than one million television picture tubes.

It must be recognized that changes may be made in the above-described solutions and the proportions thereof without departing from the true spirit and scope of the invention herein involved, and it is intended that the subject matter in the above depiction shall be interpreted as illustrative and not in a limiting sense.

I claim:

1. A solution for rewetting a phosphor-bearing image display faceplate prior to aluminizing consisting essentially of:
   (1) an aqueous colloidal dispersion of silica particles, said particles comprising about 0.5 to 1.5 weight percent;
   (2) a nonionic surfactant comprising about 0.001 to 0.004 weight percent; and
   (3) an acidic pH-lowering substance in an amount sufficient to adjust pH to about 6.2 to 7.8.

2. The solution according to claim 1 wherein the pH-lowering substance is acetic acid.

3. A solution for rewetting a phosphor-bearing image display faceplate prior to aluminizing consisting essentially of
   (1) an aqueous solution of potassium silicate, said potassium silicate comprising about 0.3 to 1.0 weight percent;
   (2) a nonionic surfactant comprising about 0.01 to 0.02 weight percent; and,
   (3) an acidic pH-lowering substance in an amount sufficient to adjust pH to about 6.8 to 7.8.

4. The solution according to claim 3 wherein the pH-lowering substance is acetic acid.

* * * * *

Specific gravities of some of the pigments mentioned in salt grinding are:

| | |
|---|---|
| Copper Phthalocyanine | 1.65 |
| Chlorinated Copper Phthalocyanine 14-15 Cl per mole | 1.90 |
| Pigment Violet 23 | 1.45 |
| Quinacridone | 1.51 |

Specific gravities of some of the salts mentioned as grinding medium:

| | |
|---|---|
| Sodium Chloride | 2.17 |
| Sodium Carbonate | 2.53 |
| Aluminum Chloride | 2.44 |
| Potassium Chloride | 1.98 |
| Sodium Sulphate | 2.70 |
| Calcium Chloride Anhydrous | 2.15 |
| Calcium Carbonate | 2.83 |
| Sodium Acetate Anhydrous | 1.52 |
| Magnesium Sulphate | 2.66 |
| Barium Sulphate | 4.50 |

Specific gravities of the liquid media: (Only a few are mentioned as examples)

| | | |
|---|---|---|
| Alcohols | Methyl Alcohol | 0.793 |
| | Ethyl Alcohol Anhydrous | 0.792 |
| | Isopropyl Alcohol Anhydrous | 0.787 |
| Ketones | Acetone | 0.792 |
| | Isophorone | 0.923 |
| | Methyl Ethyl Ketone | 0.806 |
| | Methyl Butyl Ketone | 0.811 |
| Glycol Ethers | Ethylene Glycol Methyl Ether | 0.963 |
| Aromatic Hydrocarbon Solvents | Toluene | 0.872 |
| Aliphatic Petroleum Solvents | Heptane | 0.699 |

The specific gravity of the liquid medium may be somewhat higher in use since it contains the organic conditioning agent in solution.

An illustrative example will show that separation of the pigment from the salt can be made in a centrifugal field due to gravity differences. A salt ground mass containing copper phthalocyanine blue and sodium sulphate which is subsequently diluted with isopropyl alcohol the following differential $\Delta p$ is developed.

| | | | |
|---|---|---|---|
| sp gr | Copper Phthalocyanine- 1.65 | sp gr | Isopropyl Alcohol 0.79 |
| $\Delta p =$ | $1.65 - 0.79 = 0.86$ | | |
| sp gr | Sodium Sulphate 2.7 | sp gr | Isopropyl Alcohol 0.79 |
| $\Delta p =$ | $2.7 - 0.79 = 1.91$ | | |

Thus it can be seen that $\Delta p$ for the salt grinding aid is more than twice that of the phthalocyanine blue. Therefore, it will have twice the settling velocity according to Stoke's Law.

d—Is the diameter of the solid particle. Thus a particle with twice the diameter will have four times the settling velocity.

Since the salt is the harder part of the grinding mixture, it will have much larger particle sizes than the ground pigment which if properly ground is less than two microns. In a centrifugal field the larger salt particles will have a much greater settling velocity than the smaller pigment particles. An additional advantage of my invention is that the undesirable insufficiently ground pigment having larger particle diameter can be made to settle together with salt while the finely and properly ground pigment will stay in suspension as to be seen in table 1.

TABLE 1

RELATIVE SETTLING VELOCITIES VS. PARTICLES OF 1 MICRON OF SAME PRODUCT

| AGGLOMERATE PARTICLE SIZE IN MICRONS | RELATIVE SETTLING VELOCITY |
|---|---|
| 44 | 1936 |
| 30 | 900 |
| 20 | 400 |
| 10 | 100 |
| 5 | 25 |
| 3 | 9 |
| 2 | 4 |

The long grinding cycles mentioned in the literature are partly due to the effort to convert all of the pigment into the proper particle size since in the conventional finishing procedure there is no way to separate the portion that is difficult to attrite to the proper particle size. In my invention the grinding time can be reduced to an optimum where about 90% is converted to the proper particle size. The oversized material is separated with the salt in a centrifugal field to be reground in the next charge.

$w^2$—Is the same for the entire mass but can varied to obtain optimum separation for each particular mixture and system.

r—Depends on the nature and design of the equipment.

$\mu$—Viscosity. This can be varied for each system by adding different amounts of solvent to the salt grinding mass. An optimum viscosity can be worked out for each salt grinding mass in order to obtain the proper settling velocity.

With the same centrifugal equipment, the four variables $\Delta p$, $d^2$, $w^2$, $\mu$ can be varied in such a way that optimum differential settling velocities can be obtained which will separate most of the salt together with the larger insufficiently ground pigments while the properly ground material will stay in suspension.

The sediment can then be returned to the grinder. At this point, it contains most or all of the salt, the oversize pigment, some solvent and organic grinding conditioner. Depending on the centrifuging conditions, the solids content can vary from 80–95%. The solvent is flashed off for recovery from the sediment in the grinding equipment, which is then ready for another charge of pigment.

The suspension consisting of over 90% of the pigment charged, most of the conditioning agent, and most of the solvent is filtered. The presscake at the point has in its solid phase such small particles that it can usually be used directly in its final use with a minimal dispersion effort. The liquid phase consists of solvent used and some of the conditioning agent. If both of these liquids are compatible with the system to be used, no further washing of the presscake is necessary. The presscake however can also be finished up by first washing out all of the conditioning agent for complete recovery with the solvent.

The liquor and washings of this filtration contain the conditioning agent and solvent. This is transferred to a still where at first the solvent is stripped off at atmospheric pressure leaving the conditioning agent in the bottom. If the original pigment charged was quite pure, the conditioning agent can be reused in the next mill charge without distillation. However, if undesirable impurities are contained in the conditioning agent, a vacuum or atmospheric distillation may be necessary.

The presscake can be finished off according to the different methods described in the literature. An additional advantage of my invention is that the pigment suspension after the centrifugation is in such a finely divided form that all sorts of coatings and antiflocculation additions can be made effectively.

Through the proper centrifugation, a narrow cut of pigment particle size distribution can be separated in the supernatant layer which is a distinct advantage known to those skilled in the art.

As can be seen, there is an almost total recycling of the grinding salts and conditioning agents which in the previous state of the art went in the effluent streams. Therefore, my invention results in better economics, better environment, and an improved pigment from the standpoint of particle size.

My invention can be demonstrated in the laboratory in the following way:

1. Take a salt ground mass prepared by the various methods described in the literature or from those prepared by proprietary processes and disperse with a compatible solvent in a Cowles type disperser.

2. The selection of the solvent depends upon the organic conditioning agent employed. It should be compatible with the organic treating agent. A satisfactory exploratory method for selecting the proper solvent is to choose one with similar solubility parameters or polar properties. For the illustrative examples isopropyl alcohol anhydrous and methyl ethyl ketone have been selected but the invention is not limited to these two solvents. Any solvent that will form a smooth suspension with the salt ground mass and will not affect adversely the pigment properties can be chosen. The ratio of solvent to mass will have to be determined by experimentation for each salt grinding composition in order to obtain the proper differential settling velocity between the salt and the pigment.

3. The smooth suspension is now placed in a laboratory tube centrifuge such as the Clay-Adams Cynac Type. For purposes of this experimentation, a model with 50 cc tubes and the following characteristics is used:

| Speed Setting | RPM | Relative Centrifugal Force |
|---|---|---|
| 24 | 1000 | 180 |
| 63 | 2000 | 730 |
| 100 | 2790 | 1425 |

The mass is spun at different velocities and different times in order to obtain the optimum differential settling rates between pigment and salt. Another variable that can be introduced is viscosity which can be adjusted by variation of the amount of solvent added.

With a few experiments, a sediment can be obtained that contains practically all of the salt, and the undesirable oversized pigment particles, while the supernatant liquid has a narrow cut of pigment with the proper particle size and possibly some salt, depending upon the original grinding conditions.

4. The supernatant liquid is not filtered. At this point, there are various options of treating the filter cake:

Option 1: If no soluble salt is present, and if the conditioning agent and solvent are compatible with the final system in which the pigment is to be used, the presscake can be taken out of the filter. Since, through proper centrifugation, there are no particles larger than 2 microns, the pigment can be considered in a dispersed form and the presscake can be charged directly to the final pigment vehicle system with a minimum dispersion effort.

Option 2: If no soluble salt or othe impurities are present and the conditioning agent is not compatible with final pigment use, wash the presscake free of conditioning agent with additional solvent. If the solvent is compatible with the final pigment use, it is possible to charge the presscake directly in the final pigment vehicle system, with a minimum dispersion effort. Such a solvent presscake is particularly suitable to replace the present aqueous presscake for the flushing process, since it can be charged directly to the vehicle without the necessary breaching. The solvent can be stripped off much easier than the water. It may even be possible through proper solvent selection to eliminate the entire flushing and stripping procedure.

Option 3: If no soluble salt or other undesirable impurities are present, but a dry color is desired, the presscake is washed free of conditioning agent with additional solvent and then charged to a vacuum drier or solvent proof drier where the solvent is stripped off for complete recovery. In order to obtain the proper dispersibility of this dry color, it is possible to add certain conditioning agents, either at the stage of the supernatant layer or in the vacuum drier. The literature mentions many of these additives and the procedure is well known to those skilled in the arts. The impurities in the presscake depend upon the impurity of the original pigment. It may be possible that some of the impurities will get washed out with the solvent, but if that is not possible, then the procedures described in the literature, such as aqueous acid and alkali extraction, will be necessary. Also, if all of the soluble salt has not been eliminated through optimum centrifugation, a water wash will be necessary.

Option 4: If some soluble salt is present in the presscake, but there are no undesirable impurities, wash free of conditioning agent with solvent and then wash with water until the cake is free of salt. The presscake is now a finely divided pigment which can be used in aqueous systems with a minimum dispersion effort or it can be used in flushes or finished as dry color by the methods known to those skilled in the art. Most of the solvent in the presscake can be recovered by stripping.

Option 5: If undesirable impurities are present, the presscake is washed free of conditioning agent with additional solvent and then charged to an aqueous solution of either acid or alkali or both as described in the literature. The aqueous suspension is heated and the solvent is stripped off for recovery. The material is then finished off according to the methods described in the literature.

For plant production, a Bird Continuous Horizontal Centrifuge or a Sharples Super D Canter Continuous Bowl Centrifuge or similar equipment can be employed to separate the salt and oversized pigment from the finely and properly ground pigment. This type of machine consists essentially of two concentric rotating elements surrounded by a stationary housing. The outer element is a solid wall bowl so shaped that the solids discharge from a smaller radius than the liquid. The inner element is a hollow hub screw conveyor with blade tips shaped to fit closely to the contour of the solid bowl.

Feed slurry, introduced within the conveyor hub by pump or gravity flow through stationary pipe, is accelerated to machine speed and then delivered centrifugally through ports in the conveyor hub to the liquid pool retained within the solid bowl. The gear unit maintains a slight constant differential speed between bowl and conveyor so that the solids which have settled through the liquid pool and compacted against the bowl wall as a result of centrifugal force are conveyed continously toward one end of the bowl and discharged as cake product. Clarified liquid discharges continuously from the other end of the bowl over adjustable weirs as it is displaced by incoming feed. In the case of my invention, the cake product discharged will be salt and oversized pigment with a solid content of above 85%. The "Clarified Liquid" will contain pigments of less than two micron size. The conditions of this type of machine can be so adjusted that optimum separation can be accomplished. The adjustable variables for such a machine are feed rate, pond depth, bowl speed and back drive speed.

This invention is adapted for grinding the usual materials normally subjected to salt milling, examples of which are the copper phthalocyamines, chlorinated phthalocyamine, carbazole violet and quinacridone.

Conditioners include aniline, dimethyl aniline, ethylene glycol, etc.

The solent or dispersing agent may be any liquid that is a solvent for the conditioner that is not reactive toward the pigment. Specific examples are isopropyl alcohol, acetone, methylethyl ketone, dioxane ethylene glycol methyl ether, morpholine, methyl alcohol, nitropropane and dimethylformamide.

My invention will be further illustrated by the following examples wherein the term "parts" refers to parts by weight:

EXAMPLE 1

Purpose: to compare the product of my method with the product of a conventional prior art method.

Into a Baker-Perkins Sigma mixer with a working capacity of 0.7 U.S. gallon were charged:
  sodium chloride (325 mesh): 850 parts
  copper phthalocyanine 93% purity: 240 parts
  ethylene glycol: 150 parts
  aniline: 48 parts The material was ground for six hours and additional sufficient ethylene glycol (about 70 parts) was added to keep the mass in a cohesive form during the attrition. The ground mass was dispersed in a high speed blender with 1.5 times its weight of isopropyl alcohol. The content of this dispersion was placed into several 50 cc tubes and spun for two minutes in a centrifuge at 1000 xg. The dispersion separated into a supernatant liquid and a sediment. The supernatant liquid was poured off, filtered, washed free of ethylene glycol and aniline with additional isopropyl alcohol and then with water free of electrolytes.

At this point, the filter presscake is in such finely divided state that it can be used directly in water based finishes with a minimum dispersion effort, or can be dried for non-aqueous finishes. The resulting pigment being free of agglomerates larger than six microns will give a lacquer finish with considerably higher gloss and higher tinting strength and cleanliness than a copper phthalocyanine pigment finished by the procedures described in a prior art reference wherein 50 grams of a grind similar to the above was mixed with 1000 parts of water containing 21 parts of 93% sulfuric acid, stirred for one hour at 85°–95° C., and washed with water until neutral.

The filter cakes prepared by my new method of finishing and the previously described method of finishing were compared for agglomerate size distribution in a Coulter Counter. The pigment finished by centrifugal separation has a very narrow agglomerate size distribution, with no agglomerate larger than six microns, while the conventionally finished product has a very broad agglomerate distribution ranging as far as 44 microns.

The liquor filtrate and washings of the supernatant liquid consisting of isopropyl alcohol, aniline and ethylene glycol were placed in a distilling flask where the isopropyl alcohol was stripped off leaving an line and ethylene glycol in the bottom, which could then be used for the next cycle.

The sediment had about 87% solids (dry basis). The solids consisted of about 83% salt, 2.5% insufficiently attrited copper phthalocyanine blue and the rest impurities insoluble in isopropyl alcohol. The liquid phase was mostly isopropyl alcohol with some ethylene glycol and aniline. This sediment was returned to the Baker-Perkins mixer and the alcohol stripped off for recovery, leaving the salt, some aniline in the glycol in the mixer to which the blue and the rest of the conditioning agents could be added for starting of the next cycle.

This new method of finishing through centrifugation resulted in a superior phthalocyanine blue and an almost total recycling of the salt and the conditioning agent.

EXAMPLE 2

Purpose: to show the use of an insoluble salt or mineral as grinding aid.

Into a Baker-Perkins mixer with a working capacity of 0.7 U.S. gallon are charged:
  natural barites (free of soluble salts and ground to below 325 mesh): 1200 parts
  copper phthalocyanine (94% purity): 100 parts
  diethylene glycol: 70 parts
  diethyl aniline: 20 parts The material was ground for ten hours and sufficient diethylene glycol was added to keep the mass in a cohesive form during the attrition. The ground mass was then dispersed in 2000 parts of 2 nitropropane and then submitted to a centrifugal force of 1000 xg. The supernatant liquid was poured off, filtered, washed free of diethylene glycol and diethylaniline. The presscake now consisted of finely dispersed copper phthalocyanine and small amounts of finely ground barites in nitropropane.

This presscake was suitable for use directly with a minimum dispersion effort in the following coating compositions: nitrocellulose, thermoplastic acrylics, chlorinated rubber, thermoplastic polyamide, solid epoxy resins formulated for maintenance coatings, vinyl resins, elastomeric urethane resins, ASP alcohol soluble propionate.

The sediment from the centrifugation was returned to the mixer where the nitropropane was stripped off for recovery while the barites were ready for the next cycle of grinding.

The filtrate and the washings from the supernatant liquid were sent to a distillation unit where the nitropropane was stripped off for recovery, leaving the diethylene glycol and diethyl aniline in the bottom for reuse in the next grinding cycle.

EXAMPLE 3

Purpose: to demonstrate the use of a decanter-type centrifuge.

In a 50 gallon Baker-Perkins Sigma mixer are charged 68 kilos sodium chloride (325 mesh), 12 kilos copper phthalocyanine (92% purity), 12 kilos ethylene glycol and 2 kilos diethyl aniline. This material was ground with jacket cooling and the temperature was maintained at 75° C. for six hours. This mass was then dispersed with a high speed disperser with 200 kilos of methanol. The dispersed mass was then run through a 6" continuous solid bowl centrifuge.

The two principal elements of the solid bowl centrifuge are the rotating bowl, which is the settling vessel, and the conveyor which discharges the settled solids. As the bowl rotates, centrifugal force causes the slurry to form an annular pool, the depth of which is determined by the adjustment of the effluent weirs. A portion of the solid bowl is reduced in diameter so that it is not submerged in the pool and thus forms a drainage deck for draining the solids. The dispersed mass is fed through the stationary supply pipe and passes through a conveyor hub into the bowl itself. As the solids settle out in the bowl, due to the centrifugal force, they are picked up by the conveyor scroll and carried along continuously to the solid outlets. The supernatant liquid containing the properly classified pigment continuously overflows the effluent weirs.

The machine is set to 1000 xg and the feed was adjusted for a retention time of two minutes. The discharged cake consisted of 85-90% salt and 2-3% oversize pigment, plus some impurities contained in the original pigment. The discharged cake was then charged back to the Baker-Perkins mixer where the methanol was stripped off for recovery leaving the salt with some ethylene glycol and aniline which could be used for the next grinding cycle. The supernatant liquid was filtered, washed free of ethylene glycol and aniline with additional methanol and then with water free of salts.

The presscake containing finely divided pigment was suitable for use directly in water based systems with a minimum dispersion effort or it could be dried for non-aqueous finishes. The filtrate of the supernatant liquid and the methanol washings were sent to a still where the methanol was stripped off for recovery and the bottoms consisting of ethylene glycol and aniline could have been used for a succeeding grinding cycle.

This process gives a superior pigment due to its absence of oversized pigment agglomerates and insufficiently attrited crude pigment. At the same time, this process is an almost closed cycle making the recovery of raw materials possible economically while, in the conventional finishing process, the salts and organic treating agents enter the effluent streams.

What is claimed is:

1. In salt grinding of pigments, the improvement comprising
   (a) milling oversize pigment with an inorganic salt and a conditioner until a predetermined state of comminution is achieved,
   (b) dispersing the mixture in an organic liquid which is a solvent for said conditioner, is inert to said pigment and will not dissolve said inorganic salt,
   (c) separating the resulting dispersion into a liquid phase comprising a suspension of properly sized pigment in the resultant solution of said organic liquid and conditioner, and a solid phase comprising oversize pigment and said inorganic salt,
   (d) returning said solid phase to a subsequent batch of oversize unmilled pigment,
   (e) separating said suspension into product pigment and solution of conditioner and organic liquid,
   (f) separating said organic liquid from said conditioner, and
   (g) returning said organic liquid and conditioner to the system for use with subsequent batches of pigment.

2. The invention of claim 1 wherein the pigment is copper phthalocyanine, the solvent is isopropyl alcohol, the grinding aid is a salt of a mineral acid and the conditioner is a mixture of ethylene glycol and aniline.

3. The invention of claim 1 wherein the pigment is carbazole violet, the solvent is methyl alcohol, and the conditioner is hexylene glycol.

4. The invention of claim 1 wherein the pigment is copper phthalocyanine green, the grinding aid is a metal salt, the conditioner is diethylene glycol, and the solvent is a liquid ketone.

5. The invention of claim 1 wherein the pigment is alpha crystalline phthalocyanine blue, the grinding aid is a sodium salt, the dispersing medium is ethyl alcohol, and the conditioner is dimethyl sulfoxide.

6. The invention of claim 1 wherein the solvent after removal of the pigment is separated into pure solvent and conditioner.

7. The invention of claim 1 wherein the liquid solvent for said conditioner is selected from the group consisting of methyl alcohol, isopropyl alcohol, acetone, methylethyl ketone, dioxane, ethylene glycol, methyl ether, morpholine, nitropropane and dimethylformamide.

8. The invention of claim 1 wherein the inorganic salt is water insoluble.

9. The invention of claim 8 wherein the salt is barium sulfate or calcium carbonate.

10. The invention of claim 1 wherein said dispersion is separated into the liquid phase and the solid phase by centrifuging.

* * * * *